(12) United States Patent
Yoshikawa et al.

(10) Patent No.: US 6,248,383 B1
(45) Date of Patent: Jun. 19, 2001

(54) AGENT FOR IMPROVING WATER BINDING CAPACITY OF MEAT AND METHOD OF MAKING

(75) Inventors: Kuniaki Yoshikawa; Toshiyuki Muraki; Eriko Morimoto; Masato Kobayashi; Takashi Hagi; Hajime Hatta; Yoshifumi Yamazaki, all of Yokkaichi (JP)

(73) Assignee: Taiyo Kagaku Co., Ltd., Miek (JP)

( * ) Notice: Subject to any disclaimer, the term of this patent is extended or adjusted under 35 U.S.C. 154(b) by 0 days.

(21) Appl. No.: 09/180,831

(22) PCT Filed: Mar. 12, 1998

(86) PCT No.: PCT/JP98/01080

§ 371 Date: Nov. 13, 1998

§ 102(e) Date: Nov. 13, 1998

(87) PCT Pub. No.: WO98/41101

PCT Pub. Date: Sep. 24, 1998

(30) Foreign Application Priority Data

| Mar. 14, 1997 | (JP) | 9-081856 |
| Oct. 30, 1997 | (JP) | 9-315945 |
| Oct. 30, 1997 | (JP) | 9-315946 |
| Dec. 17, 1997 | (JP) | 9-364657 |
| Dec. 17, 1997 | (JP) | 9-364658 |
| Dec. 17, 1997 | (JP) | 9-364659 |

(51) Int. Cl.$^7$ ........................................ A23L 1/317
(52) U.S. Cl. .................. 426/332; 426/32; 426/55; 426/56; 426/59; 426/92; 426/574; 426/641; 426/652; 426/656
(58) Field of Search ................ 426/332, 32, 55, 426/56, 59, 92, 574, 641, 652, 656

(56) References Cited

U.S. PATENT DOCUMENTS

| 3,970,520 | * | 7/1976 | Feldman et al. | 426/59 |
| 4,482,574 | * | 11/1984 | Lee | 426/56 |
| 4,871,575 | * | 10/1989 | Callahan et al. | 426/652 |

OTHER PUBLICATIONS

Satterlee et al. "Utilization of Beef and Pork Skin Hydrolyzates as a Binder". Journal of Food science, 38(2) p. 268–270, 1973.*

* cited by examiner

*Primary Examiner*—Helen Pratt
(74) *Attorney, Agent, or Firm*—Birch, Stewart, Kolasch & Birch, LLP

(57) ABSTRACT

The meat quality-improving agent of the present invention includes an enzymatic hydrolyzate of a protein. By using the above meat quality-improving agent for frozen meats, pressured and heat-sterilized foods, or processed ground meat foods, an improvement in the water binding capacity, suppression of the meat shrinkage upon grilling, and an improvement in the texture is shown.

14 Claims, No Drawings

AGENT FOR IMPROVING WATER BINDING CAPACITY OF MEAT AND METHOD OF MAKING

This application is the national phase under 35 U.S.C. §371 of prior PCT International Application No. PCT/JP98/01080 which has an International filing date of Mar. 12, 1998 which designated the United States of America, the entire contents of which are hereby incorporated by reference.

TECHNICAL FIELD

The present invention relates to a meat quality-improving agent comprising an enzymatic hydrolyzate of a protein. More specifically, the present invention relates to a meat quality-improving agent which can be used in meat stored under freezing, ground meat processed foods, fried meat foods, heat- and pressure-sterilized foods, and the like. Further, the present invention relates to a method for improving meat in which the above meat quality-improving agent is used.

BACKGROUND ART

Generally, a muscle protein of meat is denatured by heat, thereby usually posing various problems, including dripping, grilling shrinkage, dryness in texture and toughness. Although these changes by heating bring out the inherently good taste of meat and make the meat more palatable on one hand, they on the other hand cause meat processing-related problems, including giving considerably poorer appearance, toughened texture, dry texture by the loss of juiciness, and decreased yield. These problems are more markedly notable in fried foods and pressure- and heat-sterilized foods, which have undergone stringent heating conditions, causing undesirable phenomena, such as yield reduction and breakdown of meat tissues. In addition, in processed foods using ground meat, so called "oil dripping" or "water release" occurs in which an animal fat, i.e., lard, contained in, or added to, raw material meat melts and flows out during heating.

Generally, a majority of the raw materials which can be used in such processed meat foods are frozen meat. When stored under freezing conditions in a long term, the water binding capacity of meat is decreased, so that the above-described problems incurred in meat processing become more markedly notable.

Conventionally, polymerized phosphates or saccharides have been added for improvement of the water binding capacity of frozen meat. However, since such substances must be added in large amounts to obtain sufficient effects, there arise the problems of drastically deteriorated flavor and texture of processed meat foods. Many of the currently generally produced processed meat foods, such as ham and sausages, are widely supplemented with protein materials, such as vegetable proteins, egg proteins, milk proteins and blood proteins, and mucopolysaccharides, such as carrageenan and gelatin, as binders for the purpose of improving bindability, water binding capacity, and yield. These binders, together with polymerized phosphates as curing agents, are added to meat to improve its water binding capacity and increase its yield. However, its texture is such that the meat is plainly chewy, losing the fibrous texture of meat and juiciness (meat texture).

In addition, although thermally coagulating proteins, such as egg albumen powder and soybean protein, and polysaccharides having gelation properties, such as carrageenan and gelatin, have water binding capacity in themselves, when added to the frozen meat of which the water binding capacity is once decreased, the decreased water binding capacity of frozen meat cannot be improved to the pre-freezing level without decreasing its flavor and texture.

Conventionally, as methods of suppressing a decrease in texture of meat which can be used in pressure- and heat-cooked foods, there have been disclosed some methods including a method comprising treating raw material meat with an animal protein, such as gelatin, albumin or casein (Japanese Patent Laid-Open No. Hei 5-64567); a method comprising adding a mucopolysaccharide other than animal proteins, such as guar gum, xanthan gum or carrageenan to raw material meat (Japanese Patent Laid-Open No. Hei 9-51757); and a method comprising immersing meat in a calcium-containing solution and a polymerized phosphate-containing solution as pretreatments, and then subjecting the treated meat to a heat-and-pressure treatment (Japanese Patent Laid-Open No. Hei 4-341160).

Although the method of adding an animal protein is effective in suppressing the amount of dripping formed upon pressure- and heat-sterilization of meat, the method is undesirable because of toughened texture or uniform texture without the texture inherently owned by the meat. Although the method of adding a mucopolysaccharide is effective in tenderizing the meat and suppressing its breakdown, the method gives rise to tacky texture after pressurization and heating. The method of adding a calcium solution or polymerized phosphate has a defect in that the meat gets a flexible, uniform, ham-like texture, thereby losing the texture of inherently owned by the meat, and none of these conventional methods can sufficiently satisfy in the improvements of the texture of meat after pressure- and heat-sterilization.

An object of the present invention is to provide a meat quality-improving agent for improving the water binding capacity of meat, particularly meat of which its water binding capacity is once lowered by storing under freezing and meat to be subjected to pressure- and heat-sterilized treatment, for improving the texture of the meat, and for suppressing meat shrinkage upon grilling of the meat.

Another object of the present invention is to provide a method for improving meat characterized by using the above meat quality-improving agent.

These and other objects of the present invention will be apparent from the following description.

DISCLOSURE OF INVENTION

In sum, the present invention pertains to the following:

[1] a meat quality-improving agent comprising an enzymatic hydrolyzate of a protein;

[2] the meat quality-improving agent according to item [1], which is used for meat stored under freezing, used for meat for pressure- and heat-sterilized foods, or added upon preparation of processed ground meat food;

[3] processed meat food including the meat quality-improving agent according to item [1];

[4] a method for improving meat quality, characterized in that the meat quality-improving agent according to item [1] is added to meat having a low water binding capacity, frozen meat having a low water binding capacity, or meat of which the water binding capacity is lowered by storage under freezing, to improve its water binding capacity;

[5] a method for improving meat quality, characterized in that the meat quality-improving agent according to item [1] is added to meat having a low water binding capacity, frozen meat having a low water binding capacity, or meat of which the water binding capacity is lowered by storage under freezing, to suppress meat shrinkage upon grilling;

[6] a method for improving meat quality, characterized in that the meat quality-improving agent according to item [1] is added to meat for pressure- and heat-sterilized foods to improve texture of meat, or upon preparation of processed ground meat food to improve texture of meat; and

[7] a method for producing processed meet food, characterized in that a seasoning including the meat quality-improving agent according to item [1] is added thereto.

BEST MODE FOR CARRYING OUT THE INVENTION

1. Meat Quality-Improving Agent of the Present Invention

The meat quality-improving agent of the present invention comprises an enzymatic hydrolyzate of a protein.

The raw material protein for the present invention is not particularly subjected to limitation, and examples thereof include egg albumen protein, egg yolk protein, soybean protein, wheat protein, corn protein, rice protein, plasma protein, muscle protein, and milk protein. From the viewpoint of the flavor of hydrolyzates, the egg albumen protein is preferred.

As to the egg albumen, it may take any form without being not particularly subjected to limitation, including fresh egg albumen liquid, frozen egg albumen liquid, and powdered egg albumen, as long as it is separated from an egg. The fresh egg albumen liquid or frozen egg albumen liquid is preferred from the viewpoint of processability.

The enzyme is not particularly subjected to limitation, as long as it is a protease (protein-decomposing enzyme) of plant, animal or bacterial origin. The protease extracted from cells of the genus Bacillus is preferred because of little formation of components giving bitter taste. More preferably, the proteases extracted from cells of *Bacillus lichenniformis, Bacillus thermoproteolyticus* Rokko, *Bacillus subtilis,* etc. are used. Their use is more preferred, since the enzymatic hydrolyzates obtained have substantially no bitter taste and do not lower the flavor of processed meat foods.

The method for extraction of the protease used in the present invention from cells is not particularly subjected to limitation, and general enzyme extraction methods are applicable. Alternatively, commercially available enzymes may be also used.

The conditions for the enzymatic hydrolysis treatment for the raw material protein are not particularly subjected to limitation, and it is preferable that the enzymatic hydrolysis is carried out at a temperature of from 55° to 65° C. at a pH of from 7 to 10. More preferably, the hydrolyzing temperature is from 60° to 65° C. at a pH of from 8 to 10. From the viewpoint of the reaction rate of hydrolysis, it is preferred that the hydrolyzing temperature is 55° C. or higher at a pH of 7 or higher. From the viewpoint of suppression of the denaturation by heat of the raw material protein, the hydrolyzing temperature is preferably 65° C. or lower. From the viewpoint of suppression of the alkali denaturation of the raw material protein, the pH is preferably 10 or lower.

The degree of hydrolysis of the enzymatic hydrolyzate is not particularly subjected to limitation, and it is preferable that the amount of amino groups of the enzymatic hydrolyzate is from 7 to 20 times the amount of the raw material protein. More preferably, the mean amino acid chain length of the enzymatic hydrolyzate is from 2 to 15. In addition, the free amino acid content is preferably 20% by weight or less of the enzymatic hydrolyzate.

From the viewpoints of obtaining an effect for improving the water binding capacity and an effect for improving the texture for the obtained processed meat food, it is preferable that the amount of amino groups is from 7 to 20 times, more preferably from 7 to 15 times, and still more preferably from 7 to 12 times, the amount of the raw material protein.

From the viewpoints of coagulation ability and viscosity increase upon heating, it is preferable that the mean amino acid chain length is from 2 to 15. The mean amino acid chain length is more preferably from 3 to 12, still more preferably from 3 to 10, and most preferably from 3 to 8.

Also, since the amount of the enzymatic hydrolyzate added is limited because free amino acids significantly affect the taste, the amount of the enzymatic hydrolyzate is limited. Therefore, it is preferable that the free amino acid content is 20% by weight or less of the enzymatic hydrolyzate. Because the hydrolyzates of proteins in common use for seasonings usually contain free amino acids in a content exceeding 20% by weight of the total amount, there are some cases where no satisfactory effects are obtained. The free amino acid content is more preferably from 0 to 15% by weight, more preferably from 0 to 10% by weight, of the enzymatic hydrolyzate.

The term "amount of amino groups" as used in the present invention refers to the amount of amino groups of terminal amino groups and lysine residues of the raw material protein or the enzymatic hydrolyzate of a protein. The amount of amino groups, the mean amino acid chain length, and the free amino acid content can be determined by the formol titration method, the TNBS color development method, the ninhydrin color development method, or the like.

The meat quality-improving agent of the present invention may be an enzymatic hydrolyzate of a protein as is, or it may contain a component other than enzymatic hydrolyzates of proteins. In the latter case, the meat quality-improving agent of the present invention can be used as a pickle solution, a seasoning solution, an immersion solution, a kneading preparation, a seasoning, or the like. Components that can be included in the meat quality-improving agent of the present invention in the latter case include protein materials, such as egg albumen, soybean protein, casein, milk protein, plasma protein, collagen and gelatin, mucopolysaccharides such as carrageenan and dextrin, salts, such as sodium nitrite and sodium chloride, saccharides, such as sucrose and starch, seasonings, phosphates, cold water and emulsifiers.

The meat in the present invention is meat generally used for foods. Examples thereof include livestock meat, such as beef, pork, chicken, mutton and horse meat, and fish meat of whales, tunas, bonitos, salmons, sardines, herrings, shrimps and lobsters, squids, octopuses, shellfish and scallops. The meat is not particularly subjected to limitation as to portions, grades, shapes, etc., and it may be fresh or frozen.

The meat quality-improving agent of the present invention acts on meat with low water binding capacity (e.g., meat of which the water binding capacity is decreased due to storage under freezing) to improve its water binding capacity.

The term "meat with low water binding capacity" or "meat with decreased water binding capacity" refers to meat no longer capable of binding water to the extent at which fresh meat can bind water. The reduction in the water binding capacity takes place, for example, during storage under freezing of meat. Because meat with decreased water binding capacity releases a large amount of water upon thawing or heating, some undesirable phenomena, such as toughened texture after cooking, take place. For this reason, meat with decreased water binding capacity is evaluated low to be used as edible meat. The meat quality-improving agent of the present invention is preferably applicable to the meat of which the water binding capacity is once decreased as described above, in such cases, a marked effect in improving the once decreased water binding capacity of the meat can be exhibited.

As described above, because the meat quality-improving agent of the present invention serves to improve the water binding capacity of the meat, an effect for suppressing meat shrinkage upon grilling and hence an effect for improving the texture can be exhibited, when added to meat with low water binding capacity, frozen meat with low water binding capacity, meat of which the water binding capacity is decreased due to storage under freezing, or the like.

The water binding capacity of the meat in the present invention can be determined as follows:

The subject meat is packed in a tube and boiled at 70° C. for 30 minutes to prepare sausage. A weight (A) of meat, including the tube, before sausage preparation, a weight (B) of the sausage after tube removal and thorough free water removal by cloth wiping, and a weight (C) of the tube are measured. The water binding rate of the meat is calculated by the following equation:

$$\text{Water binding rate (\%)} = \left[1 - \frac{(A - B - C)}{(A - C)}\right] \times 100$$

The water binding capacity of meat reflects the yield upon cooking. When meat with improved water binding capacity is cooked, its yield is therefore high.

Another problem, dripping, arises in pressure- and heat-sterilization of meat. When adding the meat quality-improving agent of the present invention, an effect of suppressing the amount of dripping without lowering the texture can be exhibited. This effect is exhibited not only on meat with a decreased water binding capacity but also on meat without a decrease in the water binding capacity.

Upon heating ground meat, there arise problems of oil dripping and water release. When adding the meat quality-improving agent of the present invention, an effect of suppressing the amount of the oil dripping can be exhibited. This effect can be exhibited not only on ground meat with a decreased water binding capacity but also on ground meat without a decrease in the water binding capacity.

2. Method for Improving Meat Quality of the Present Invention

The method for improving meat quality of the present invention is characterized by adding the meat quality-improving agent of the present invention to meat.

The amount of the meat quality-improving agent of the present invention added to meat is not particularly subjected to limitation, and it is preferable that the meat quality-improving agent is added in an amount from 0.3 to 6.0 parts by weight, more preferably from 0.5 to 3.0 parts by weight, based on 100 parts by weight of meat, calculated as the amount of the enzymatic hydrolyzate (dry weight). From the viewpoint of ensuring the desired quality-improving effect, the amount of the meat quality-improving agent is preferably 0.3 parts by weight or more, and from the viewpoint of cost effectiveness, the amount is preferably 6.0% by weight or less.

The methods of adding the meat quality-improving agent of the present invention to meat include, for example, a method of directly adding an enzymatic hydrolyzate of a protein as is to a subject meat; and a method of adding an enzymatic hydrolyzate of a protein dissolved in water, a pickle solution, a seasoning solution, or the like, to a subject meat by means of injection or immersion. Also, upon the preparation of processed ground meat foods, the meat quality-improving agent of the present invention may be added to the meat by, for example, a procedure comprising kneading the meat quality-improving agent with the raw material meat.

The enzymatic hydrolyzate of the protein is more widely dispersed in the meat by tumbling meat supplemented with the meat quality-improving agent of the present invention, or allowing the above mixture to stand, for a given period of time, preferably 2 hours or more. Therefore, tumbling or allowing to stand the meat after adding the meat quality-improving agent is highly effective. In the case of immersion, the enzymatic hydrolyzate of the protein can be efficiently added to meat when the immersion time in the immersion method is 2 hours or more, depending on the size of the meat.

Also, in a case of adding meat stored under freezing, the meat quality-improving agent of the present invention is preferably added after thawing.

The meat thus processed is supplied as food after usual cooking processes. An effect of improving the meat quality by the method of the present invention is not reduced by any means by the kind of cooking methods employed. Therefore, the method for improving meat quality of the present invention does not by any means limit the cooking method of the meat with improved quality. Meat of which quality is once improved may be stored under freezing.

When the method for improving meat quality of the present invention is applied to meat, an effect of improving the water binding capacity of the meat can be observed, so that effects of suppressing the meat shrinkage upon grilling, improving the texture of the meat, and the like can be exhibited.

When the method for improving meat quality of the present invention is applied to meat for pressure- and heat-sterilization, an effect of suppressing dripping without lowering the texture of the meat can be exhibited.

When the method for improving meat quality of the present invention is applied to processed ground meat food, effects of suppressing oil dripping and water release can be exhibited.

Improvement of the water binding capacity can be evaluated by, for example, the above-described testing method by preparation of sausage. Also, the suppression of meat shrinkage upon grilling can be evaluated by, for example, comparing the areas of meat before and after grilling. In addition, the texture can be evaluated by, for example, sensory evaluation testing by panelists.

3. Processed Meat Food of the Present Invention

The processed meat food of the present invention is processed meat food including the quality-improving agent of the present invention. Concrete examples of the processed meat foods include fried meat foods, such as pork cutlets, fried chickens, nuggets and tempura; processed ground meat foods, such as hamburgers, meatballs and ingredients of gyoza and meat buns; and pressure- and heat-sterilized foods prepared by sealing in cans, retorted pouches or other containers, such as canned foods and retorted foods, and subjecting the sealed product to pressure- and heat-sterilization. Other foods, such as ham, sausage, bacon, roasted pork and roasted beef, can be also included. Here, the ground meat includes minced meat or pasted meat (forcemeat).

Since of the processed meat food of the present invention includes the meat quality-improving agent of the present invention, the resulting food is imparted with improved quality. Therefore, the processed meat food of the present invention has improved water binding capacity and a tender and juicy texture, i.e., the texture inherently owned by the meat (meat texture). In addition, it undergoes little meat shrinkage upon grilling.

The processed meat food of the present invention can be easily produced by, for example, cooking meat by adding of a seasoning including the meat quality-improving agent of the present invention, or by cooking meat of which quality is improved by the method for improving meat quality of the present invention.

The present invention will be concretely explained on the basis of the following working Examples.

EXAMPLE 1

To 1,000 g of liquid egg albumen was added a 3 N citric acid solution, and the pH of the resulting solution was adjusted to 8.5, and 7 g of "ORIENTASE 22BF" (derived from *Bacillus subtilis,* manufactured by Hankyu Bioindustry Co., Ltd.) was added thereto, and the mixture was reacted at 60° C. for 10 hours. The mixture was heated at 90° C. for 15 minutes to inactivate the enzyme, and the pH of the reaction mixture was adjusted to 7.0, and then the reaction mixture was spray-dried, to give Enzymatic Hydrolyzate 1. The amino group content of Enzymatic Hydrolyzate 1 was determined by the TNBS method. As a result, it was found to be 17.6 times that of the liquid egg albumen before hydrolysis. Also, the mean amino acid chain length of Enzymatic Hydrolyzate 1 was 6.1, and its free amino acid content was 4% by weight.

Further, similar treatments were carried out except that the amount of the enzyme added was changed to a 1/50 times that of the above, to give Enzymatic Hydrolyzate 2, of which the amino group content was found to be 2.3 times that of the liquid egg albumen before hydrolysis. The mean amino acid chain length of Enzymatic Hydrolyzate 2 was 23.4, and its free amino acid content was 1% by weight or less. Moreover, similar treatments were carried out except that the amount of the enzyme added was changed to 20 times that of above, to give Enzymatic Hydrolyzate 3, of which the amino group content was found to be 27.2 times that of the liquid egg albumen before hydrolysis. The mean amino acid chain length of Enzymatic Hydrolyzate 3 was 1.4, and its free amino acid content was 60% by weight.

EXAMPLE 2

To 1,000 g of liquid egg albumen was added a 3 N citric acid solution, and the pH of the resulting solution was adjusted to 7.8, and 5 g of "ALKALASE" (derived from *Bacillus inchenniformis,* manufactured by Novo Nordisk Industries, Ltd.) was added thereto, and the mixture was reacted at 65° C. for 20 hours. The mixture was heated at 87° C. for 30 minutes to inactivate the enzyme, and the pH of the reaction mixture was adjusted to 7.0, and then the reaction mixture was spray-dried, to give Enzymatic Hydrolyzate 4. The amino group content of Enzymatic Hydrolyzate 4 was determined by the TNBS method. As a result, it was found to be 10.1 times that of the liquid egg albumen before hydrolysis. Also, the mean amino acid chain length of Enzymatic Hydrolyzate 4 was 7.8, and its free amino acid content was 3% by weight.

EXAMPLE 3

To 1,000 g of liquid egg albumen was added a 3 N citric acid solution, and the pH of the resulting solution was adjusted to 8.5, and 4 g of "THERMOASE" (derived from *Bacillus thermoproteolyticus* Rokko, manufactured by Daiwa Kasei K.K.) was added thereto, and the mixture was reacted at 65° C. for 10 hours. The mixture was heated at 87° C. for 30 minutes to inactivate the enzyme, and the pH of the reaction mixture was adjusted to 7.0, and then the reaction mixture was spray-dried. The amino group content of the resulting powder was determined by the TNBS method. As a result, it was found to be 9.5 times that of the liquid egg albumen before hydrolysis. A mixture comprising 50% by weight of a powder prepared by spray-drying (Spray-Dried Powder A) and 50% by weight of egg albumen powder was referred to as Enzymatic Hydrolyzate 5. Also, the mean amino acid chain length of Spray-Dried Powder A was 7.9, and its free amino acid content was 3% by weight.

EXAMPLE 4

To 1,000 g of liquid egg albumen was added a 3 N citric acid solution, and the pH of the resulting solution was adjusted to 7.0, and 4 g of "ORIENTASE ONS" (derived from *Aspergillus oryzae,* manufactured by Hankyu Bioindustry Co., Ltd.) was added thereto, and the mixture was reacted at 65° C. for 10 hours. The mixture was heated at 70° C. for 60 minutes to inactivate the enzyme, and the pH of the reaction mixture was adjusted to 7.0, and then the reaction mixture was spray-dried, to give Enzymatic Hydrolyzate 6. The amino group content of Enzymatic Hydrolyzate 6 was determined by the TNBS method. As a result, it was found to be 12.5 times that of the liquid egg albumen before hydrolysis. Also, the mean amino acid chain length of Enzymatic Hydrolyzate 6 was 7.2, and its free amino acid content was 3% by weight.

EXAMPLE 5

In 900 g of water was dissolved 100 g of sodium caseinate ("SUNLACT S-3" manufactured by Taiyo Kagaku Co., Ltd.), and the pH of the resulting solution was adjusted to 8.0, and 2 g of "THERMOASE" (derived from *Bacillus thermoproeolyticus* Rokko, manufactured by Daiwa Kasei K.K.) was added thereto, and the mixture was reacted at 65° C. for 25 hours. The mixture was heated at 87° C. for 30 minutes to inactivate the enzyme, and the pH of the reaction mixture was adjusted to 7.0, and then the reaction mixture was spray-dried. The amino group content of the resulting powder was determined by the TNBS method. As a result, it was found to be 15.5 times that of sodium caseinate before hydrolysis. A mixture comprising 50% by weight of a powder prepared by spray-drying (Spray-Dried Powder B) and 50% by weight of egg albumen powder was referred to as Enzymatic Hydrolyzate 7. Also, the mean amino acid chain length of Spray-Dried Powder B was 3.6, and its free amino acid content was 4% by weight.

EXAMPLE 6

In 900 g of water was dissolved 100 g of soybean protein ("FUJIPRO R," manufactured by FUJI OIL CO., LTD.), and the pH of the resulting was adjusted to 8.0, and 0.4 g of "ALKALASE" (derived from *Bacillus inchenniformis,* manufactured by Novo Nordisk Industries, Ltd.) was added thereto, and the mixture was reacted at 65° C. for 12 hours. The mixture was heated at 87° C. for 30 minutes to inactivate the enzyme, and the pH of the reaction mixture was adjusted to 7.0, and then the reaction mixture was spray-dried, to give Enzymatic Hydrolyzate 8. The amino group content of Enzymatic Hydrolyzate 8 was determined by the TNBS method. As a result, it was found to be 15.5 times that of the soybean protein before hydrolysis. Also, the mean amino acid chain length of Enzymatic Hydrolyzate 8 was 5.2, and its free amino acid content was 7% by weight.

Incidentally, each of the mean amino acid chain lengths of the enzymatic hydrolyzates and the spray-dried powders was determined by HPLC, and the free amino acid content was determined by formol titration.

TEST EXAMPLE 1

The effects of enzymatic hydrolyzate were evaluated by sausage model testing. The mixing ratios of the raw materials are shown in Table 1. Samples were prepared by a conventional method. Specifically, ham stored at −20° C. for 6 months was chopped by a conventional method. Next, the minced ham and the remaining raw materials were mixed in the ratios shown in Table 1 and degassed, after which the mixture was cured at 5° C. for 24 hours. The cured raw material mixture was packed in a vinylidene chloride tube having an inner diameter of 4 cm and kept in a hot water bath at 70° C. for 30 minutes. Subsequently, the heated packed material was cooled in a water vessel at 15° C. for 1 hour.

In the tables below, Hydrolyzates 1 through 8 indicate Enzymatic Hydrolyzates 1 through 8, respectively. Controls 1 through 3 used in Test Examples below are those described in Test Examples 3 and 8.

TABLE 1

| | Addition of Hydrolyzate 1 | Addition of Hydrolyzate 2 | Addition of Hydrolyzate 3 | A No Addition | B No Addition |
|---|---|---|---|---|---|
| 6-Month Frozen Ham | 47.8 | 47.8 | 47.8 | 50.68 | — |
| Unfrozen Ham | — | — | — | — | 50.68 |
| Iced Water | 49.8 | 49.8 | 49.8 | 47.8 | 47.8 |
| Salt | 1.43 | 1.43 | 1.43 | 1.43 | 1.43 |
| Sodium Nitrite | 0.02 | 0.02 | 0.02 | 0.02 | 0.02 |
| Sodium Ascorbate | 0.07 | 0.07 | 0.07 | 0.07 | 0.07 |
| Hydrolyzate | 0.88 | — | — | — | — |
| Hydrolyzate 2 | — | 0.88 | — | — | — |
| Hydrolyzate 3 | — | — | 0.88 | — | — |

All values are expressed in % by weight.

The evaluated results of the water binding rates and the bitterness for the addition of enzymatic hydrolyzates and no addition sausage ("A No Addition" and "B No Addition") are shown in Table 2.

TABLE 2

| | Addition of Hydrolyzate 1 | Addition of Hydrolyzate 2 | Addition of Hydrolyzate 3 | A No Addition | B No Addition |
|---|---|---|---|---|---|
| Water Binding Rate (%) | 81.1 | 57.3 | 67.3 | 56.3 | 79.9 |
| Bitterness | None | None | Slight Bitterness | None | None |

As is evident from Table 2, the sausage supplemented with Enzymatic Hydrolyzate 1 and "B No Addition" showed almost the same water binding rate, so that there can be found that in Enzymatic Hydrolyzate 1, the water binding capacity of meat of which the water binding capacity once decreased by freezing could be improved to the pre-freezing level. Enzymatic Hydrolyzates 2 and 3 had little improvement effects in the water binding capacity. In addition, the sample supplemented with Enzymatic Hydrolyzate 3 had a slightly bitter taste.

TEST EXAMPLE 2

Loin ham was produced using various enzymatic hydrolyzates. The mixing ratios of the pickle solutions of the loin ham used are shown in Table 3. Here, the raw material meat used was loin ham frozen at −18° C. for 5 months, the soybean protein used was "FUJIPRO R" (manufactured by Fuji Oil Co., Ltd.), an egg albumen powder used was "Egg Albumen Powder HG" (manufactured by Taiyo Kagaku Co., Ltd.) and sodium caseinate used was SUNLACT S-3" (manufactured by Taiyo Kagaku Co., Ltd.).

TABLE 3

| | Addition of Hydrolyzate 4 | Addition of Hydrolyzate 2 | A No Addition | B No Addition |
|---|---|---|---|---|
| Iced Water | 78.52 | 78.52 | 78.52 | 78.52 |
| Salt | 2.50 | 2.50 | 2.50 | 2.50 |
| Spices, Seasonings | 1.00 | 1.00 | 1.00 | 1.00 |
| Sugar | 2.00 | 2.00 | 2.00 | 2.00 |
| Corn Syrup | 4.00 | 4.00 | 4.00 | 4.00 |
| Sodium Nitrite | 0.08 | 0.08 | 0.08 | 0.08 |
| Sodium Ascorbate | 0.40 | 0.40 | 0.40 | 0.40 |
| Sodium Tripolyphosphate | 1.00 | 1.00 | 1.00 | 1.00 |
| Soybean Protein | — | — | 3.35 | 3.35 |
| Egg Albumen Powder | — | — | 2.15 | 2.15 |
| Sodium Caseinate | — | — | 5.00 | 5.00 |
| Hydrolyzate 4 | 10.50 | — | — | — |
| Hydrolyzate 2 | — | 10.50 | | |
| Raw Material Meat | Frozen | Frozen | Frozen | Unfrozen |

All values are expressed in % by weight.

The loin ham was prepared by a conventional method. Specifically, 80 parts by weight of a pickle solution of each composition shown in Table 3 was injected to 100 parts by weight of loin ham by means of an injector, followed by tumbling under vacuum conditions for 15 hours. After completion of the tumbling, the ham was shaped and packed in a fibrous casing, after which it was dried, smoked, boiled, then cooled in a refrigerator to a temperature not higher than 5° C.

Loin ham samples prepared with addition of various enzymatic hydrolyzates and those prepared without enzymatic hydrolyzates ("A No Addition" and "B No Addition") were evaluated with respect to heating yield and slicing qualification. The heating yield was evaluated as a percent ratio of weight after heating, such as drying, smoking, or boiling to weight before heating. The slicing qualification was evaluated by sensory examination of the split state of 2 mm thick slices of each sample with a 10-grade mean value rating system by 10 panelists, with 10 points for the maximum and 0 points for the minimum. The results are shown in Table 4.

TABLE 4

|  | Addition of Hydrolyzate 4 | Addition of Hydrolyzate 2 | A No Addition | B No Addition |
|---|---|---|---|---|
| Heating Yield (%) | 85.4 | 80.2 | 79.4 | 83.1 |
| Slicing Qualification | 9.2 | 5.8 | 5.6 | 8.9 |

As is evident from Table 4, the loin ham sample obtained with addition of Enzymatic Hydrolyzate 4 and "B No Addition" showed almost the same yield, so that there can be found that in the enzymatic hydrolyzate, the water binding capacity of meat of which the water binding capacity once decreased by freezing could be improved to the pre-freezing level, thereby improving the yield and the slicing qualification of the loin ham.

TEST EXAMPLE 3

Loin ham was prepared by way of trial, using Enzymatic Hydrolyzates and Control 1 (egg albumen powder "Egg Albumen Powder HG," manufactured by Taiyo Kagaku Co., Ltd.). The compositions of the pickle solutions used are shown in Table 5.

TABLE 5

|  | Addition of Hydrolyzate 1 | Addition of Hydrolyzate 8 | Addition of Control 1 |
|---|---|---|---|
| Salt | 5.0 | 5.0 | 5.0 |
| Sugar | 2.5 | 2.5 | 2.5 |
| Dextrin | 7.0 | 7.0 | 7.0 |
| Sodium Caseinate | 1.5 | 1.5 | 1.5 |
| Sodium Tripolyphosphate | 1.0 | 1.0 | 1.0 |
| Sodium Ascorbate | 0.2 | 0.2 | 0.2 |
| Sodium Nitrite | 0.05 | 0.05 | 0.05 |
| Monosodium Glutamate | 0.6 | 0.6 | 0.6 |
| Spices | 0.2 | 0.2 | 0.2 |
| Water | 75.45 | 75.45 | 75.45 |
| Hydrolyzate 1 | 6.5 | — | — |
| Hydrolyzate 8 | — | 6.5 | — |
| Control 1 | — | — | 6.5 |

All values are expressed in % by weight.

The raw material meat used was Japanese frozen pork loin, and dextrin used was "TK-16" (manufactured by Matsutani Kagaku Industry, Co., Ltd.). Loin ham was prepared as follows: First, 40 parts by weight of each pickle solution shown in Table 5 was injected based on 100 parts by weight of pork loin with an injector, followed by 15 hours of tumbling in a vacuum. After completion of the tumbling, the meat was shaped and packed in fibrous casing, followed by drying, smoking, and boiling. Thereafter, the cooked meat was cooled to a temperature of 5° C. or less in a refrigerator.

Each loin ham which contained each of Enzymatic Hydrolyzates and Control was evaluated with respect to yield and texture. The yield was evaluated for two items: heating yield expressed by a weight change before and after the drying, smoking and boiling processes, and product yield expressed by a weight change between raw material meat and a finished product, each yield being expressed in percentage. The flavor and the texture were evaluated by sensory examination with a 10-grade mean value rating system by 10 skilled panelists, with 10 points for the maximum and 0 points for the minimum. The results are shown in Table 6.

TABLE 6

|  | Addition of Hydrolyzate 1 | Addition of Hydrolyzate 8 | Addition of Control 1 |
|---|---|---|---|
| Heating Yield (%) | 89.1 | 88.2 | 86.4 |
| Product Yield (%) | 122.7 | 122.0 | 119.5 |
| Texture |  |  |  |
| Tenderness | 9 | 8 | 6 |
| Flexibility | 7 | 7 | 6 |
| Juiciness | 10 | 9 | 5 |
| Meat Texture | 8 | 8 | 5 |
| Overall Evaluation | 8.5 | 8.0 | 5.5 |
| Flavor | 8 | 4 | 8 |

As is evident from Table 6, the yields for the loin ham supplemented with each of Enzymatic Hydrolyzates were better than that with the loin ham supplemented with Control 1. In addition, as to the texture, Control 1 provided a highly flexible, "kamaboko"-like texture, while Enzymatic Hydrolyzate 1 was tender and juicy, with good meat texture. The loin ham supplemented with Enzymatic Hydrolyzate 8 had a slightly bitter flavor.

TEST EXAMPLE 4

Sausages were prepared by way of trial using each of Enzymatic Hydrolyzates and Control. The compositions of the pickle solutions are shown in Table 7.

TABLE 7

|  | Addition of Hydrolyzate 1 | Addition of Hydrolyzate 8 | Addition of Control 1 |
|---|---|---|---|
| Salt | 6.0 | 6.0 | 6.0 |
| Sugar | 2.5 | 2.5 | 2.5 |
| Dextrin | 5.0 | 5.0 | 5.0 |
| Sodium Caseinate | 1.5 | 1.5 | 1.5 |
| Sodium Tripolyphosphate | 1.2 | 1.2 | 1.2 |
| Sodium Ascorbate | 0.3 | 0.3 | 0.3 |
| Sodium Nitrite | 0.05 | 0.05 | 0.05 |
| Monosodium Glutamate | 0.7 | 0.7 | 0.7 |
| Spices | 0.2 | 0.2 | 0.2 |
| Water | 74.55 | 74.55 | 74.55 |
| Hydrolyzate 1 | 8.0 | — | — |
| Hydrolyzate 8 | — | 8.0 | — |
| Control 1 | — | — | 8.0 |

All values are expressed in % by weight.

The raw material meat was Japanese frozen pork hock, and dextrin used was "TK-16" (manufactured by Matsutani Kagaku Industry, Co., Ltd.). Sausages were prepared as follows: First, the raw material hock, previously thawed, was cut into pieces of an appropriate size, and the pieces were ground by using an automatic mincer. Thereafter, 30 parts by weight of each pickle solution shown in Table 7 was injected based on 100 parts by weight of the meat. Next, the resulting mixture was mixed in a mixer, then transferred to a vat, and cured under 5° C. refrigeration for 15 hours. After completion of the curing, the meat was cut with a silent cutter and packed in sheep gut, followed by drying, smoking, and boiling. Thereafter, the product was cooled to a temperature of 5° C. or less in a refrigerator.

Each sausage which contained each of Enzymatic Hydrolyzates and Control was evaluated with respect to yield and texture. The yield was evaluated for two items: heating yield expressed by a weight ratio change before and after the drying, smoking and boiling processes, and product yield expressed by a weight ratio change between raw material meat and a finished product, each yield being expressed in percentage. The flavor and the texture were evaluated by sensory examination with a 10-grade mean value rating system by 10 skilled panelists, with 10 points for the maximum and 0 points for the minimum. The results are shown in Table 8.

TABLE 8

|  | Addition of Hydrolyzate 1 | Addition of Hydrolyzate 8 | Addition of Control 1 |
|---|---|---|---|
| Heating Yield (%) | 87.7 | 86.5 | 84.6 |
| Product Yield (%) | 111.6 | 109.6 | 107.9 |
| Texture |  |  |  |
| Tenderness | 9 | 9 | 5 |
| Flexibility | 6 | 6 | 6 |
| Juiciness | 10 | 9 | 5 |
| Meat Texture | 7 | 6 | 4 |
| Overall Evaluation | 8 | 7.5 | 5 |
| Flavor | 8 | 4 | 8 |

As is evident from Table 8, the yield for the sausage supplemented with Enzymatic Hydrolyzate 1 was better than with the sausage supplemented with Enzymatic Hydrolyzate 8. In addition, as to the texture, the sausage supplemented with Control 1 had a highly flexible, "kamaboko"-like texture, while the sausage supplemented with each of Enzymatic Hydrolyzates was tender and juicy, with good meat texture.

TEST EXAMPLE 5

The pork cutlets were prepared by way of trial, using each of Enzymatic Hydrolyzate 1 and Enzymatic Hydrolyzate 8. The compositions of the pickle solutions used are shown in Table 9. The raw material meat used was Japanese frozen pork loin, and dextrin used was "TK-16" (manufactured by Matsutani Kagaku Industry, Co., Ltd.). Pork cutlets were prepared as follows: First, 30 parts by weight of each pickle solution shown in Table 9 was injected based on 100 parts by weight of pork loin with an injector, followed by 15 hours of tumbling. After shaping, the meat was stored under freezing conditions at −26° C. overnight, and then cut into slices of 1 cm thickness with a frozen meat slicer, followed by flouring, battering, and breading. Thereafter, the breaded slices were fried in corn oil at 170° C. for 5 minutes.

TABLE 9

|  | Addition of Hydrolyzate 1 | Addition of Hydrolyzate 8 |
|---|---|---|
| Salt | 3.0 | 3.0 |
| Sugar | 4.0 | 4.0 |
| Sodium Tripolyphosphate | 1.2 | 1.2 |
| Dextrin | 6.6 | 6.6 |
| Water | 77.4 | 77.4 |
| Hydrolyzate 1 | 7.8 | — |
| Hydrolyzate 8 | — | 7.8 |

All values are expressed in % by weight.

Each pork cutlet which contained each of Enzymatic Hydrolyzate 1 and Enzymatic Hydrolyzate 8 was evaluated with respect to yield and texture. In addition as no addition product, another pork cutlet prepared by cutting frozen pork loin into slices of 1 cm thickness, flouring, battering, and breading, was then evaluated with respect to yield and texture in the same manner as above. The results are shown in Table 10.

The yield was a ratio of the weight of the finished pork cutlet with its breading removed to the weight of the raw material pork loin, expressed in percentage. The texture was evaluated by sensory examination with a 10-grade mean value rating system by 10 skilled panelists, with 10 points for the maximum and 0 points for the minimum.

TABLE 10

|  | Addition of Hydrolyzate 1 | Addition of Hydrolyzate 8 | No Addition |
|---|---|---|---|
| Yield (%) | 123.3 | 116.8 | 87.6 |
| Texture |  |  |  |
| Tenderness | 9 | 7 | 3 |
| Flexibility | 7 | 7 | 4 |
| Juiciness | 10 | 6 | 3 |
| Meat Texture | 8 | 8 | 6 |
| Overall Evaluation | 8.5 | 7 | 4 |
| Flavor | 9 | 3 | 10 |

As is evident from Table 10, the pork cutlet supplemented with each of Enzymatic Hydrolyzates showed higher yields, and its texture was tender, richly juicy, with good meat texture.

TEST EXAMPLE 6

Fried chickens were prepared by way of trial, using each of Enzymatic Hydrolyzates. The compositions of the seasoning solutions used are shown in Table 11. The raw material chicken used was chicken frozen for 8 months. Fried chickens were prepared by a conventional method. Specifically, 50 parts by weight of a seasoning solution including each of Enzymatic Hydrolyzates was added to 100 parts by weight of chicken thigh, followed by 5 hours of tumbling. Thereafter, the chicken was fried at 170° C. for 4 minutes.

TABLE 11

|  | Addition of Hydrolyzate 5 | Addition of Hydrolyzate 6 | Addition of Hydrolyzate 7 | Addition of Hydrolyzate 8 |
|---|---|---|---|---|
| Ice Water | 87.50 | 87.50 | 87.50 | 87.50 |
| Salt | 0.50 | 0.50 | 0.50 | 0.50 |
| Seasonings | 0.50 | 0.50 | 0.50 | 0.50 |
| Sugar | 6.00 | 6.00 | 6.00 | 6.00 |
| Soy Sauce | 0.50 | 0.50 | 0.50 | 0.50 |
| Hydrolyzate 5 | 5.00 | — | — | — |
| Hydrolyzate 6 | — | 5.00 | — | — |
| Hydrolyzate 7 | — | — | 5.00 | — |
| Hydrolyzate 8 | — | — | — | 5.00 |

All values are expressed in % by weight.

Each fried chicken prepared by supplementing with each of Enzymatic Hydrolyzates was evaluated with respect to yield and bitterness. In addition, as no addition product, fried chickens prepared from frozen chicken thigh without supplementing with any seasoning solution was evaluated with respect to yield and bitterness in the same manner as above. The results are shown in Table 12.

TABLE 12

|  | Addition of Hydroly- zate 5 | Addition of Hydroly- zate 6 | Addition of Hydroly- zate 7 | Addition of Hydroly- zate 8 | No Addition |
| --- | --- | --- | --- | --- | --- |
| Yield (%) | 69.4 | 70.0 | 68.6 | 67.1 | 58.1 |
| Bitterness | None | Slight | Much | Much | None |

(Yield when using unfrozen chicken as raw materials: 69.2%)

As is evident from Table 12, since the fried chicken prepared by supplementing with each of Enzymatic Hydrolyzates had a yield similar to that for fried chicken from non-frozen chicken, without lowering the flavor for fried chickens, it was found that each of the enzymatic hydrolyzates could improve the water binding capacity once decreased due to freezing to that of the pre-freezing level. Also, in a case where a meat quality-improving agent obtained by hydrolysis of a egg albumen protein with a protease extracted from cells other than those of the genus Bacillus, Enzymatic Hydrolyzate 6, was used, a slight bitterness developed. In a case where those supplemented by a protein other than a egg albumen protein, Enzymatic Hydrolyzate 7 or Enzymatic Hydrolyzate 8, was added, a stronger bitterness, attributable to the hydrolyzate, developed.

TEST EXAMPLE 7

Fried chickens were prepared by way of trial, using each of Enzymatic Hydrolyzate 1 and Enzymatic Hydrolyzate 8. The compositions of the pickle solutions used are shown in Table 13. The raw material meat used was Japanese frozen chicken breast, and dextrin used was "TK-16" (manufactured by Matsutani Kagaku Industry, Co., Ltd.). Fried chickens were prepared as follows: First, 25 parts by weight of each pickle solution shown in Table 13 was added to 100 parts by weight of chicken breast, previously husked and bored, using a tender. The breast was then vacuum-packed in a vinylidene chloride bag, followed by 15 hours of tumbling. After shaping, the chicken breast was subjected to flouring and battering, and then it was fried in corn oil at 170° C. for 2 minutes.

TABLE 13

|  | Addition of Hydrolyzate 1 | Addition of Hydrolyzate 8 |
| --- | --- | --- |
| Salt | 2.5 | 2.5 |
| Sugar | 4.0 | 4.0 |
| Sodium Tripolyphosphate | 0.3 | 0.3 |
| Dextrin | 15.0 | 15.0 |
| Water | 68.2 | 68.2 |
| Hydrolyzate 1 | 10.0 | — |
| Hydrolyzate 8 | — | 10.0 |

All values are expressed in % by weight.

Each fried chicken which contained each of Enzymatic Hydrolyzates was evaluated with respect to yield and texture. In addition, as the no addition product, fried chickens prepared from frozen chicken thigh without supplementing with any pickle solution were evaluated with respect to yield and texture in the same manner as above.

The yield was a ratio of a weight of the finished fried chicken with its coating removed to a weight of the raw material chicken breast expressed in percentage. The texture was evaluated by sensory examination with a 10-grade mean value rating system by 10 skilled panelists, with 10 points for the maximum and 0 points for the minimum. The results are shown in Table 14.

TABLE 14

|  | Addition of Hydrolyzate 1 | Addition of Hydrolyzate 8 | No Addition |
| --- | --- | --- | --- |
| Yield (%) | 101.0 | 93.6 | 75.5 |
| Texture |  |  |  |
| Tenderness | 9 | 7 | 3 |
| Flexibility | 7 | 7 | 3 |
| Juiciness | 9 | 5 | 3 |
| Meat Texture | 7 | 5 | 7 |
| Overall Evaluation | 8 | 6 | 4 |
| Flavor | 9 | 4 | 9 |

As is evident from Table 14, the fried chickens supplemented with Enzymatic Hydrolyzate 1 or Enzymatic Hydrolyzate 8 showed improved yields. In addition, the fried chicken supplemented with Enzymatic Hydrolyzate 8 had a lumpy texture, lacking the texture inherently owned by the meat, whereas the texture of the fried chickens supplemented with Enzymatic Hydrolyzate 1 was tender and juicy, with good meat texture.

TEST EXAMPLE 8

Hamburger patties were prepared by way of trial, using each of Enzymatic Hydrolyzates 1 and 8 and Controls 1 and 2 (powdered soybean protein "NEW FUJIPRO V," manufactured by FUJI OIL CO., LTD.) and Control 3 (dextrin "TK-16," manufactured by Matsutani Kagaku Industry, Co., Ltd.). The mixing ratios for the raw materials are shown in Table 15.

TABLE 15

| Starting Materials | Addition of Hydroly- zate 1 | Addition of Hydroly- zate 8 | Addition of Control 1 | Addition of Control 2 | Addition of Control 3 |
| --- | --- | --- | --- | --- | --- |
| Beef Thigh | 200 | 200 | 200 | 200 | 200 |
| Salt | 2 | 2 | 2 | 2 | 2 |
| Lard | 18 | 18 | 18 | 18 | 18 |
| Water | 30 | 30 | 30 | 30 | 30 |
| Hydrolyzate 1 | 5 | — | — | — | — |
| Hydrolyzate 8 | — | 5 | — | — | — |
| Control 1 | — | — | 5 | — | — |
| Control 2 | — | — | — | 5 | — |
| Control 3 | — | — | — | — | 5 |

The values are expressed in parts by weight.

Each of the hamburger patties prepared according to each of the mixing ratios of the raw materials was grilled in an oven at 200° C. for 10 minutes. Each of a weight of each hamburger patty before grilling and a weight after grilling was measured. Each hamburger patty supplemented with each of Enzymatic Hydrolyzates and Controls was evaluated with respect to yield and texture.

The yield was calculated from a ratio of the weight after grilling to the weight before grilling. In addition, the texture was evaluated by sensory examination with a 10-grade mean value rating system by 10 skilled panelists, with 10 points for the maximum and 0 points for the minimum. The results are shown in Table 16.

TABLE 16

|  | Addition of Hydrolyzate 1 | Addition of Hydrolyzate 8 | Addition of Control 1 | Addition of Control 2 | Addition of Control 3 |
|---|---|---|---|---|---|
| Yield (%) | 88.3 | 86.8 | 85.4 | 84.8 | 80.0 |
| Texture |  |  |  |  |  |
| Toughness | 6 | 6 | 9 | 9 | 8 |
| Flexibility | 7 | 7 | 3 | 4 | 3 |
| Juiciness | 9 | 8 | 2 | 2 | 2 |
| Meat Texture | 8 | 7 | 4 | 3 | 7 |
| Remark | Good meat texture with juiciness | Good meat texture with juiciness | Tough texture without flexibility | Tough, meat-ball-like texture | Tough, dry, brittle texture |

As is evident from Table 16, the hamburger patties supplemented with each of Enzymatic Hydrolyzate 1 and Enzymatic Hydrolyzate 8 gave excellent yields, and their texture had improved juiciness. The hamburgers supplemented with Enzymatic Hydrolyzate 8 had a strong grain odor.

TEST EXAMPLE 9

"Gyoza" was prepared by way of trial, using each of Enzymatic Hydrolyzate 1 and Controls 1 and 3. The mixing ratios for the raw materials are shown in Table 17.

TABLE 17

| Starting Materials | Addition of Hydrolyzate 1 | Addition of Control 1 | Addition of Control 3 |
|---|---|---|---|
| Pork Minced Meat | 20.0 | 20.0 | 20.0 |
| Lard | 5.0 | 5.0 | 5.0 |
| Cabbage | 45.0 | 45.0 | 45.0 |
| Green Scallions | 3.0 | 3.0 | 3.0 |
| Potato Starch | 0.5 | 0.5 | 0.5 |
| Salt | 1.0 | 1.0 | 1.0 |
| Sugar | 0.5 | 0.5 | 0.5 |
| Granular Plant Protein | 5.0 | 5.0 | 5.0 |
| Water | 15.0 | 15.0 | 15.0 |
| Beef Extract | 0.1 | 0.1 | 0.1 |
| Monosodium L-Glutamate | 0.5 | 0.5 | 0.5 |
| Sesami Oil | 1.3 | 1.3 | 1.3 |
| Spices | 0.6 | 0.6 | 0.6 |
| Soy Sauce | 0.5 | 0.5 | 0.5 |
| Hydrolyzate 1 | 2.0 | — | — |
| Control 1 | — | 2.0 | — |
| Control 3 | — | — | 2.0 |

All values are expressed in % by weight.

Each of meat dough prepared according to each mixing ratio was wrapped with a commercially available "gyoza" wrapping, and heated in a steamer for 10 minutes. The texture was evaluated by sensory examination with a 10-grade mean value rating system by 10 skilled panelists, with 10 points for the maximum and 0 points for the minimum. The results are shown in Table 18.

TABLE 18

| Texture | Addition of Hydrolyzate 1 | Addition of Control 1 | Addition of Control 3 |
|---|---|---|---|
| Toughness | 6 | 8 | 8 |
| Flexibility | 7 | 5 | 3 |
| Juiciness | 9 | 3 | 2 |
| Meat Texture | 8 | 5 | 7 |
| Remark | Tender meat texture with juiciness | Tough, uniform texture | Tough, dry, brittle texture |

As is evident from Table 18, the "gyoza" supplemented with Enzymatic Hydrolyzate 1 was tender and very juicy, so that an effect of improving texture by the addition of Enzymatic Hydrolyzate 1 was found.

TEST EXAMPLE 10

Each of "kamaboko" prepared from "surimi" prepared from walleye pollack by way of trial, using Enzymatic Hydrolyzate 1 and Controls 1 and 3. The mixing ratios for the raw materials are shown in Table 19.

TABLE 19

| Starting Materials | Addition of Hydrolyzate 1 | Addition of Control 1 | Addition of Control 3 |
|---|---|---|---|
| Frozen "Surimi" | 100.0 | 100.0 | 100.0 |
| Salt | 3.0 | 3.0 | 3.0 |
| Potato Starch | 6.5 | 6.5 | 6.5 |
| Sugar | 4.5 | 4.5 | 4.5 |
| Sweet Rice Wine-Based Seasoning | 1.0 | 1.0 | 1.0 |
| Amino Acid-Based Seasoning | 1.0 | 1.0 | 1.0 |
| Water | 50.0 | 50.0 | 50.0 |
| Hydrolyzate 1 | 1.0 | — | — |
| Control 1 | — | 1.0 | — |
| Control 3 | — | — | 1.0 |
| Total | 167.0 | 167.0 | 167.0 |

The values are expressed in parts by weight.

The raw materials mixed according to each mixing ratio were kneaded in a silent cutter, packed in casing tubes, and boiled at 90° C. for 30 minutes to give "kamaboko." For each "kamaboko" obtained, the gel strength and the size of dent were measured with a rheometer. The results are shown in Table 20.

TABLE 20

|  | Addition of Hydrolyzate 1 | Addition of Control 1 | Addition of Control 3 |
|---|---|---|---|
| Breaking Strength (g) | 267 | 295 | 260 |
| Size of Dent (mm) | 12 | 12 | 7 |
| Texture | Tender, flexible meat texture | Tough, elastic texture meat texture | Tough, dry, brittle texture |

As is evident from Table 20, the "kamaboko" supplemented with Enzymatic Hydrolyzate 1 was tender and flexible, with an excellent texture.

TEST EXAMPLE 11

Retorted curry was prepared from pork by way of trial, using each of Enzymatic Hydrolyzates and Controls. The raw materials of the pickle solutions and the compositions thereof are shown in Table 21.

TABLE 21

|  | Addition of Hydrolyzate 1 | Addition of Hydrolyzate 8 | Addition of Control 1 | Addition of Control 2 |
|---|---|---|---|---|
| Salt | 3.0 | 3.0 | 3.0 | 3.0 |
| Sugar | 4.0 | 4.0 | 4.0 | 4.0 |
| Sodium Tripolyphosphate | 1.2 | 1.2 | 1.2 | 1.2 |
| Dextrin | 6.6 | 6.6 | 6.6 | 6.6 |
| Water | 77.4 | 77.4 | 77.4 | 77.4 |
| Hydrolyzate 1 | 7.8 | — | — | — |
| Hydrolyzate 8 | — | 7.8 | — | — |
| Control 1 | — | — | 7.8 | — |
| Control 2 | — | — | — | 7.8 |

All values are expressed in % by weight.

The raw material meat used was Japanese frozen pork loin, and dextrin used was "TK-16" (manufactured by Matsutani Kagaku Industry, Co., Ltd.). After the raw material meat was thawed, 30 parts by weight of each pickle solution shown in Table 21 was injected based on 100 parts by weight of the meat with an injector, followed by 15 hours of tumbling. After completion of the tumbling, the meat was shaped into 1.5 cm cubes to give meat supplemented with each of Enzymatic Hydrolyzates and Controls. In addition as the no addition product, the raw material meat as is was shaped into 1.5 cm cubes.

In a degassed retorted pouch were packed 50 g of meat prepared above and 100 g of commercially available curry roux, and thereafter, the pressure-and-heating cooking was carried out at 121° C. for 40 minutes (F value=36).

Next, the texture of each retorted meat was then evaluated by sensory examination with a 10-grade mean value rating system by 10 skilled panelists, with 10 points for the maximum and 0 points for the minimum. The results are shown in Table 22.

TABLE 22

|  | Addition of Hydrolyzate 1 | Addition of Hydrolyzate 8 | Addition of Control 1 | Addition of Control 2 | No Addition |
|---|---|---|---|---|---|
| Texture |  |  |  |  |  |
| Tenderness | 9 | 8 | 4 | 4 | 2 |
| Flexibility | 7 | 7 | 5 | 5 | 2 |
| Juiciness | 10 | 10 | 4 | 3 | 3 |
| Meat Texture | 8 | 8 | 3 | 3 | 5 |
| Overall Evaluation | 8.5 | 8.3 | 4.0 | 3.8 | 3.0 |
| Flavor | Good | Poor | Good | Fair | Good |

As is evident from Table 22, the meat without supplement had a dry meat tissue with brittle texture, whereas the retorted meat supplemented with each of Enzymatic Hydrolyzate 1 and Enzymatic Hydrolyzate 8 was tender, flexible, and juicy with fibrous texture. However, the meat supplemented with Enzymatic Hydrolyzate 8 had a strong grain odor and strong bitterness. The meat supplemented with each of Control 1 and Control 2 had a tough, tight texture.

TEST EXAMPLE 12

Retorted beef bowls "gyudon" were prepared by way of trial, from beef supplemented with each of Enzymatic Hydrolyzate 1 and Control 1. The raw materials of the beef dipping solutions and the compositions thereof are shown in Table 23.

TABLE 23

| Starting Materials | Addition of Hydrolyzate 1 | Addition of Control 1 |
|---|---|---|
| Salt | 8.0 | 8.0 |
| Sugar | 4.0 | 4.0 |
| Dextrin | 10.0 | 10.0 |
| Sodium Tripolyphosphate | 1.0 | 1.0 |
| Water | 67.0 | 67.0 |
| Hydrolyzate 1 | 10.0 | — |
| Control 1 | — | 10.0 |

All values are expressed in % by weight.

The raw material meat used was American frozen beef loin, previously shaped into slices of 2 mm thickness of dimensions of 5 cm×2 cm. The raw material meat was thawed, and then immersed in each dipping solution shown in Table 23 for 6 hours, to give meat supplemented with each of Enzymatic Hydrolyzate and Control. In addition, as the no addition product, the raw material was used as is.

In a degassed retorted pouch were packed 50 g of the meat prepared above, 50 g of sauce, and 50 g of onion, and thereafter, the pressure-and-heating was carried out at 121° C. for 15 minutes (F value=10).

The texture of the retorted meat was evaluated by sensory examination with a 10-grade mean value rating system, by 10 skilled panelists, with 10 points for the maximum and 0 points for the minimum. The results are shown in Table 24.

TABLE 24

|  | Addition of Hydrolyzate 1 | Addition of Control 1 | No Addition |
|---|---|---|---|
| Texture |  |  |  |
| Tenderness | 7 | 2 | 1 |
| Flexibility | 7 | 4 | 2 |
| Juiciness | 8 | 4 | 2 |
| Meat Texture | 6 | 4 | 3 |
| Overall Evaluation | 7 | 3.5 | 2 |
| Remark | Tender, flexible meat texture with juiciness | Tough, uniform meat texture | Tough, dry, brittle texture, broken into pieces without retaining the original form |

As is evident from Table 24, the no addition product was tough, dry, brittle texture, broken into pieces without retaining the original form, whereas the retorted meat supplemented with Enzymatic Hydrolyzate 1 was tender, flexible, juicy texture with good retention of the original form. The retorted meat supplemented with Control 1 was uniform and tight, with tough texture.

TEST EXAMPLE 13

Beef short ribs for grilling (3 mm thickness, dimensions of 5 cm×10 cm) were immersed in a commercially available grilled beef sauce supplemented with Enzymatic Hydrolyzate or Control, and the immersed beef short ribs were heat-treated in an electric oven at 200° C. for 4 minutes. The results of the area of meat after grilling determined, to the area of meat before grilling calculated as 100, are shown in Table 25.

TABLE 25

| | Addition of Hydrolyzate 1 | Addition of Hydrolyzate 8 | Addition of Control 1 | Addition of Control 2 | No Addition |
|---|---|---|---|---|---|
| Area of Meat After Cooking (%) | 73.0 | 70.5 | 64.0 | 65.0 | 62.0 |
| Texture | Tender meat texture with juiciness | Tender meat texture with juiciness Strong grain odor | Tough meat texture with poor flexibility | Tough meat texture | Tough, dry, brittle |

The area of meat was determined as follows. A vinyl film was placed on beef short ribs arranged in rows in a vat. The outline of each meat was traced, and the film was copied by a copying machine. Portions defined by each of the copied outlines were each cut and weighed to obtain area ratios. In addition, the texture after grilling was evaluated by sensory examination by 10 skilled panelists.

As is evident from Table 25, it was found that the sauces supplemented with each of Enzymatic Hydrolyzate 1 or Enzymatic Hydrolyzate 8 had an effect of suppressing the grilling shrinkage of beef short ribs. In addition, its texture was maintained to be tender, without becoming toughened, thereby having desired juiciness.

TEST EXAMPLE 14

Beefsteak was prepared by way of trial, using each of Enzymatic Hydrolyzate and Control. The compositions of the pickle solutions used are shown in Table 26.

TABLE 26

| Starting Materials | Addition of Hydrolyzate 1 | Addition of Control 1 |
|---|---|---|
| Salt | 7.5 | 7.5 |
| Sugar | 4.0 | 4.0 |
| Dextrin | 11.00 | 11.0 |
| Sodium Tripolyphosphate | 1.5 | 1.5 |
| Monosodium Glutamate | 1.0 | 1.0 |
| Water | 65.0 | 65.0 |
| Hydrolyzate 1 | 10.0 | — |
| Control 1 | — | 10.0 |

All values are expressed in % by weight.

The raw material meat used was American frozen beef loin, and dextrin used was "TK-16" (manufactured by Matsutani Kagaku Industry, Co., Ltd.). The preparation procedures were as follows: First, 20 parts by weight of each pickle solution shown in Table 26 was injected based on 100 parts by weight of the beef loin with an injector, followed by 15 hours of tumbling. The untreated product was prepared by injecting a pickle solution to raw material meat as is, shaping the meat, and freezing at −26° C. overnight. Thereafter, the frozen meat was then cut into slices of 1 cm thickness with a frozen meat slicer.

The meat slices were heat-treated in an electric oven at 200° C. for 10 minutes. The area of meat after grilling was determined, to the area of meat before grilling calculated as 100. The texture after grilling was evaluated by sensory examination by 10 skilled panelists with a 10-grade mean value rating system, with 10 points for the maximum and 0 points for the minimum. The areas of meat were determined in the same manner as in Test Example 13. The results are shown in Table 27.

TABLE 27

| | Addition of Hydrolyzate 1 | Addition of Control 1 | No Addition |
|---|---|---|---|
| Area of Meat After Cooking (%) | 82.4 | 76.3 | 73.8 |
| Texture | | | |
| Tenderness | 7 | 3 | 3 |
| Flexibility | 7 | 6 | 4 |
| Juiciness | 10 | 4 | 3 |
| Meat texture | 8 | 3 | 6 |
| Overall Evaluation | 8 | 4 | 4 |
| Remark | Tender, fibrous texture with juiciness | Tight meat texture, uniform, elastic texture ham-like texture | Tough, dry, brittle texture |

As is evident from Table 27, the steak supplemented with Enzymatic Hydrolyzate 1 showed suppressed meat shrinkage upon grilling, and its texture was tender, juicy, with fibrous texture inherently owned by meat (meat texture). The steak supplemented with Control 1, egg albumen powder, had a uniform, flexible, ham-like texture.

Equivalents

Those skilled in the art will recognize, or be able to ascertain using no more than routine experimentation, many equivalents to the specific embodiments of the invention described specifically herein. Such equivalents are intended to be encompassed in the scope of the following claims.

INDUSTRIAL APPLICABILITY

The meat quality-improving agent of the present invention including the enzymatic hydrolyzate of a protein is aimed to improve the water binding capacity, suppress the meat shrinkage upon grilling, and improve the texture of meat stored under freezing, meat for pressure- and heat-sterilized foods, and processed ground meat food. Therefore, the meat quality-improving agent can be widely utilized in the field of foods in which meat is cooked. It is made possible that the method for improving meat quality of the present invention in which the meat quality-improving agent of the present invention is added is aimed to improve the water binding capacity, suppress the meat shrinkage upon grilling, and improve the texture by adding the meat quality-improving agent to meat stored under freezing and to meat for pressure- and heat-sterilized foods, and adding the meat quality-improving agent in the preparation of processed ground meat food. Therefore, the method can be widely utilized in the field of foods in which meat is cooked.

What is claimed is:

1. An agent for improving water binding capacity of meat, comprising an enzymatic hydrolyzate of egg albumin, wherein the amount of amino groups as terminal amino groups and lysine residues of the enzymatic hydrolyzate is from 7 to 20 times the amount of the egg albumin before hydrolysis.

2. The agent according to claim 1, wherein a mean amino acid chain length of the enzymatic hydrolyzate is from 2 to 15.

3. The agent according to claim 1, wherein a free amino acid content in the enzymatic hydrolyzate is 20% by weight or less of the enzymatic hydrolyzate.

4. The agent according to claim 1, wherein the enzymatic hydrolyzate is obtained by the use of a protease extracted from cells of the genus Bacillus.

5. The agent according to claim 1, wherein enzymatic hydrolysis is carried out at a temperature of from 55° to 65° C. at a pH of from 7 to 10.

6. A method for improving water binding capacity of meat, characterized in that the agent according to claim 1 is added to meat having a low water binding capacity.

7. A method for improving water binding capacity of meat, characterized in that the agent according to claim 1 is added to frozen meat having a low water binding capacity.

8. A method for improving water binding capacity of meat, characterized in that the agent according to claim 1 is added to meat which has had its water binding capacity reduced by storage under freezing temperatures.

9. A method for improving water binding capacity of meat, characterized in that the agent according to claim 1 is added to meat having a low water binding capacity to suppress meat shrinkage upon grilling.

10. A method for improving water binding capacity of meat, characterized in that the agent according to claim 1 is added to frozen meat having a low water binding capacity to suppress meat shrinkage upon grilling.

11. A method for improving water binding capacity of meat, characterized in that the agent according to claim 1 is added to meat which has had its water binding capacity reduced by storage under freezing temperatures to suppress meat shrinkage upon grilling.

12. A method for improving water binding capacity of meat, characterized in that the agent according to claim 1 is added to meat intended to be used in pressure- and heat-sterilized foods to improve meat texture.

13. A method for improving water binding capacity of meat, characterized in that the agent according to claim 1 is added upon preparation of processed ground meat food to improve meat texture.

14. The agent according to claim 1, wherein the water binding rate is about 81.1%.

* * * * *

UNITED STATES PATENT AND TRADEMARK OFFICE
CERTIFICATE OF CORRECTION

PATENT NO. : 6,248,383 B1
DATED : June 19, 2001
INVENTOR(S) : Kuniaki Yoshikawa et al.

It is certified that error appears in the above-identified patent and that said Letters Patent is hereby corrected as shown below:

<u>Title page,</u>
Item "[73] Assignee:", please change "Miek" to -- Mie --.

Signed and Sealed this

Twenty-first Day of May, 2002

Attest:

Attesting Officer

JAMES E. ROGAN
Director of the United States Patent and Trademark Office